Oct. 20, 1931. W. H. MASON Re. 18,233

HARD GRAINLESS FIBER PRODUCT AND PROCESS OF MANUFACTURE

Original Filed June 13, 1928

INVENTOR
William H. Mason
BY
Dyke and Schaines
ATTORNEYS

Reissued Oct. 20, 1931 Re. 18,233

UNITED STATES PATENT OFFICE

WILLIAM H. MASON, OF LAUREL, MISSISSIPPI, ASSIGNOR TO MASONITE CORPORATION, OF LAUREL, MISSISSIPPI, A CORPORATION OF DELAWARE

HARD GRAINLESS FIBER PRODUCT AND PROCESS OF MANUFACTURE

Original No. 1,789,825, dated January 20, 1931, Serial No. 285,065, filed June 13, 1928. Application for reissue filed June 10, 1931. Serial No. 543,464.

My invention relates to the production of fiber products suitable for use as artificial lumber and characterized by a high density and great rigidity and strength, together with resistance to penetration by water or water vapor and freedom from deterioration by action of the elements when used as building material or for like purposes.

The use of corrugated iron for the roofing and siding of buildings is well known, such material being made in various weights or thicknesses to adapt it to different uses, and galvanizing is usually resorted to in order to obtain a material having a fair degree of resistance to deterioration. Corrugated iron sheets when used for roofing are ordinarily laid upon horizontal purlins which are spaced apart at distances of three, four or five feet, and the iron sheet must be capable of sustaining a load between such points of support of about 30 to 60 pounds per square foot.

Obviously the corrugations greatly increase the stiffness of the sheet and in practice a certain form of corrugation has become standard for most purposes, viz., a distance of 2 $\frac{11}{16}$ inches from crest to crest and a depth of ½ inch from top of crest to bottom of groove. Such sheets when formed of iron of 16 to 28 gauge thickness are well adapted to sustain ordinary roof loads. Another advantage of the use of corrugated sheets is that the holes through which the nails or other securing means extend may be at the crest of the corrugations, whereby leakage of water therethrough is avoided, and the sheets may be laid in overlapping relation as regards their side edges so that the lapped portion presents an upwardly covex surface well adapted to prevent leakage. Corrugated sheets have the additional advantage that the corrugations by slight changes of curvature permit expansion and contraction of the sheet which may be caused by changes in temperature.

Corrugated iron roofing, however, even when galvanized, is subject to fairly rapid deterioration, especially when subjected to adverse weather conditions. The nail holes and spots formed by abrasion or otherwise enlarge by corrosion and the sheet, unless protected by frequent applications of paint or other protective coating, eventually loses its strength and substance. Furthermore, metal sheets have little or no heat insulating property, and consequently a building having walls or roof or both of such material is wasteful of heat in winter and uncomfortably hot in summer.

The objections inherent in the use of sheet metal, as pointed out, may be avoided by substituting therefor a non-metallic substance, provided the same can be manufactured with sufficient cheapness into corrugated sheets having sufficient strength and rigidity, resistance to water penetration and corrosion, and freedom from deterioration to enable them to be successfully used.

Vegetable fiber felted and pressed into sheets has the advantage of cheapness, but heretofore has not been produced in corrugated sheets having sufficient strength, rigidity and resistance to weather to enable them to be used as a building material substitute for corrugated iron.

The present invention has for its object the production of a vegetable fiber sheet having the necessary qualities to adapt it for use as a substitute for sheet metal for many purposes.

Reference is hereby made to the accompanying drawings, of which:

In order that a fiber sheet with sufficient strength to enable it to sustain a load of 30 to 60 pounds per square foot between purlins separated by 3 foot to 5 foot spacing, may be produced at a cost sufficiently low to enable it to be used as building material, several things should be taken advantage of.

First: The raw material should be obtainable in large quantities at a low price. This qualification is met by the use of wood chips produced from the waste wood of saw mills, or low grade wood, the quality of which is not sufficiently good to enable it to be used for lumber.

Second: The raw material should be convertible into fiber pulp at low cost and with minimum loss of material. A suitable process having the advantages mentioned is disclosed in U. S. Letters Patent No. 1,578,609, granted to me on March 30th, 1926, in accordance with which the fiber is obtained by subjecting the wood chips in a closed high pressure chamber to penetration by a fluid such as steam at high pressure, and progressively discharging the same through a constricted outlet from said chamber, whereby the sudden expansion of the fluid is utilized for disintegrating the material.

Third: The fiber pulp so obtained should preferably be sized at low cost, so that board produced therefrom will have the size distributed substantially uniformly throughout and will be highly resistant to water and moisture. A suitable process for carrying out this step is disclosed and broadly claimed in my Patent No. 1,784,993, granted on December 16th, 1930, and consists briefly in subjecting the fiber to agitation in a water bath with melted petrolatum, paraffin or equivalent hydrocarbon at a temperature sufficiently high to prevent congealing of the hydrocarbon. For example, in order to produce a sheet suitable for use as a substitute for ordinary corrugated iron, I may use the following proportions of paraffin or petrolatum, each melting at about 125° F., to one hundred parts of fiber (dry weight), viz., paraffin 1½ to 2½ per cent. or petrolatum 2 to 3 per cent. In either case, the temperature of the water bath may be at or above 130° F. Petrolatum is not as efficient per unit weight as paraffin in its waterproofing quality, but its cheapness more than compensates for the increased quantity which should be used. The pulp may be felted in any suitable apparatus, for example a machine of the Fourdrinier type by which a wet felted sheet, or "wet lap" is formed.

Figure 1:
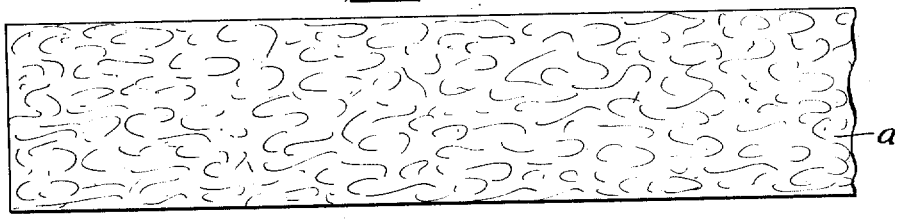
Figure 1 is an end elevation of a portion of a single wet lap sheet from which a corrugated sheet may be produced in accordance with my invention.
Figure 2:
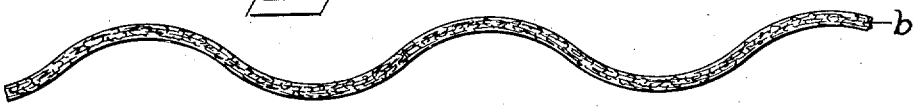
Fig. 2 is a similar view of the finished corrugated sheet.

Fourth: In forming the wet lap sheet, it is important and highly desirable, in order to obtain a product of maximum strength to resist flexure, that the fibers be well interlocked with each other in every direction. I have obtained such result by causing the pulp to be violently agitated just before it reaches the travelling screen of the Fourdrinier machine, so that at the very beginning of the formation of the sheet, the fibers are in a very loose and widely separated condition. They settle with great rapidity and quickly build up on the screen a sheet several inches thick which may be reduced by loss of free water in the machine to a wet lap sheet *a* having a thickness of about 1½ inches, as shown in Fig. 1, for the production of a corrugated sheet *b* having a thickness of ⅛ inch, as in Fig. 2. Sheets of greater thickness may be produced by proportionately increasing the fiber content of the wet lap but with a more than proportionate content of water, as will be described.

The wet lap sheet having been thus formed, is conveyed to a press in which it is subjected to high pressure, for example, from 200 pounds to 700 pounds per square inch, between heated platens as disclosed in my Patent No. 1,784,993, granted December 16th, 1930, and in my Patent No. 1,663,505, granted March 20th, 1928, care being taken that the full pressure be applied to the wet lap sheet before the temperature of any part thereof rises above the temperature at which water vaporizes, viz., 212° F. at atmospheric pressure, and that full pressure be maintained until the sheet is dry. The temperature of the platens may be from 275° F. to 500° F., although somewhat higher or lower temperatures may be employed if desired. A wire screen should be inserted between one or both of the platens and the felted sheet to permit escape of moisture during the drying operation, and to cause the finished sheet to be formed with a rough surface on one or both sides. This screen member should be of slightly greater width and length than the wet lap sheet to insure maintenance of an outlet for the moisture. It should be formed with corrugations to fit the platens and may be supported in any suitable manner.

The platens have pressing surfaces formed with corrugations of suitable size and shape for producing the desired sheet, for example, they may measure $2\frac{11}{16}$ inches from crest to crest and ½ inch from top or crest to bottom of groove.

A corrugated fiber sheet thereby obtained, in order to be used as a substitute for ordinary corrugated iron of 29 to 16 gauge, requires a certain strength which can be obtained only with a certain thickness, for example, $\frac{3}{32}$ inch to ¼ inch or more.

In attempting to produce a corrugated fiber sheet of such thickness, one encounters certain difficulties. On account of the thickness of the wet lap and the fact that it is imperfectly plastic, there is a tendency for a line of weakness to develop along the crests of the corrugations. This difficulty I have overcome by causing the body of the wet lap to be fluffy, that is, of great thickness in proportion to the quantity of fiber present, for example, 1½ inches to form a sheet of ⅛ inch thickness. Such formation may be obtained by minimizing the withdrawal of water from the sheet while it is being formed in the Fourdrinier machine or equivalent apparatus, and thereafter, and by dispensing with the use of pressing rolls, or if used, by applying only relatively low pressures. In order to produce finished sheets of great thickness, for example, 1/4 inch, the water content and thickness of the wet lap should be more than proportionately increased, or, in other words, it should be as fluffy as possible in order to increase its plasticity and avoid formation of lines of weakness along the crests of the corrugations.

The pressing of sheets having such high water content, however, introduces another difficulty, viz., the efflux of water upon application of pressure to the sheet tends to form streams which carry away pieces or fragments of the wet lap sheet. This difficulty may be overcome by operating the press with sufficient slowness to permit the water to run from the material without displacement of any of the pulp. The press should, however, be operated with such speed that full pressure is applied to the wet lap sheet before the temperature of the surface of the material or of any portion thereof rises above 212° F. By maintaining the full pressure of the press, which may be from 200 pounds to 700 pounds per square inch, upon the sheet until it is thoroughly dry, a strong, dense and perfect corrugated sheet of a thickness of 3/32 inch to 1/4 inch or possibly more may be obtained. The material of such finished sheets has a very high resistance to flexure, equal to that of many woods with the grain, and on account of the corrugated form of the sheet the resistance to flexure in one direction is vastly increased, so that the fiber sheets may be used as a substitute for corrugated sheet iron for the roofing and siding of buildings, and for other purposes. Its specific gravity is approximately one.

Figure 3:
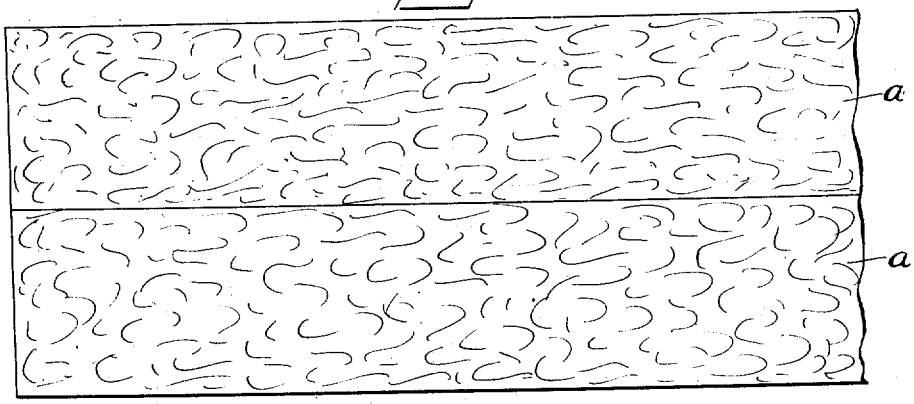
Fig. 3 is a similar view of two superposed sheets of wet lap.

Instead of forming the corrugated sheets by the pressing and drying of a single wet lap sheet as described, I have discovered that sheets of any desired thickness may be obtained by forming wet lap sheets in the manner previously described, arranging two or more of such sheets *a* in superposed relation to one another, as shown in Fig. 3, and thereupon subjecting the built up sheet or body so formed to pressure and heat in the press. In this case the wet lap does not need to be of the fluffy or flocculent character described, but may have the free water substantially removed therefrom before it is placed in the press, and if desired, each of the wet lap sheets may be formed with corrugations pressed or rolled therein before being placed in superposed relation. In the hot pressing of the built-up wet lap sheet, one should take care as before that full pressure be applied before the platens heat the surface of the wet lap materially above 212° F., and that full pressure be maintained until the built-up sheet is completely dry.

Figure 4:
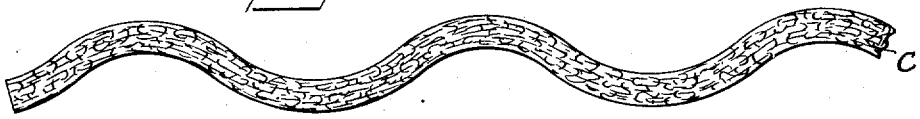
Fig. 4 is a similar view of a corrugated sheet formed therefrom.
Figure 5:
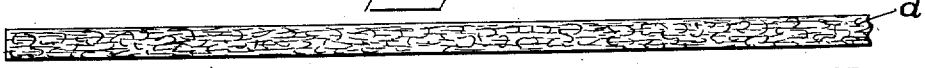
Fig. 5 is a similar view of a flat sheet formed from the wet lap sheets of Fig. 3.

When this is done, the final product is a homogeneous corrugated sheet *c*, as illustrated in Fig. 4, no line of demarcation being observable between its different layers. The separate layers are connected or welded together by the action under heat and pressure of the natural cementitious material of the original wood, probably the lignins. This process just described is useful in the production not only of corrugated sheets but also flat sheets *d*, as shown in Fig. 5, and fiber products of any special or desired conformation.

I claim:

1. A corrugated building board of vegetable fiber hot platen pressed from a web of wet vegetable fiber until substantially dry and of substantially permanent gauge dimension and specific gravity approximately one, or more than one, same being resistant to atmospheric corrosion, and of strength, stiffness and rigidity sufficient to adapt it for use as a building material in place of corrugated iron.

2. A vegetable fiber sheet built up by the welding together of superposed layers of wet lap sheets by means of the natural cementitious constituents of the original fibrous raw material.

3. A water resistant vegetable fiber sheet formed of a plurality of superposed layers of wet lap sheets containing a water insoluble size, said layers being welded together by the natural cementitious constituent of the original fibrous raw material.

4. A corrugated vegetable fiber sheet built up by the welding together of superposed layers of wet lap sheets by means of the natural cementitious constituent of the original fibrous raw material.

5. A water resistant corrugated vegetable fiber sheet formed of a plurality of superposed layers of wet lap sheets containing a water insoluble size, said layers being welded together by the natural cementitious constituent of the original fibrous raw material.

6. In a process of making a corrugated board having great tensile strength, the steps of forming a fibrous felted sheet having a high water content, placing said sheet between heated platens in a press and compressing same at such rate as to express the water without carrying away portions of the sheet and to apply a high pressure thereto before the surface of the material is heated above the vaporizing temperature of water.

7. In a process of making a corrugated board having great tensile strength, the steps of forming a fibrous felted sheet having a high water content, placing said sheet between heated platens in a press and compressing the same at such rate as to express the water without carrying away portions of the sheet and to apply a high pressure thereto before the surface of the material is heated above the vaporizing temperature of water, and maintaining such high pressure until the sheet is substantially dry throughout.

8. In a process of making a vegetable fiber board, the step of forming a wet lap sheet and subjecting the same to high pressure between heated platens so shaped as to form corrugations on the sheet, the full pressure being applied to the sheet before the temperature of any portion of its surface is raised above the vaporizing temperature of water.

9. In a process for the production of strong, dense sheets of felted ligno-cellulose material, forming a wet felted sheet of fibrous material consisting principally of cellulose and a substantial proportion of lignin and subjecting the same to pressure and heat sufficient to compact, consolidate and dry the same, the full pressure being applied to said sheet before the temperature of any part of the material is heated above 212° F.

10. A process of compacting a body of felted fiber containing expressible water, cellulose and a substantial proportion of lignin which comprises the application thereto of pressure by a pressing surface at a temperature materially above 212° F., the pressure being applied to the material with such speed that water is expressed therefrom at the moment that a pressure of at least 200 pounds per square inch is attained, whereby heating of the material to a temperature in excess of 212° F. at a pressure below 200 pounds per square inch is avoided.

11. A process of compacting a body of felted fiber containing cellulose and a substantial proportion of lignin, which comprises the felting of such material from a water bath to produce a felted sheet having a high water content and a thickness several times as great as the final product, and applying pressure thereto by means of a pressing surface at a temperature of 220° F. or higher, the pressure being applied to the material with such speed as to express free water therefrom as it attains a value of 200 pounds per square inch.

In testimony whereof, I have signed my name hereto.

WILLIAM H. MASON.